US009365158B2

United States Patent
Barlow, Jr. et al.

(10) Patent No.: US 9,365,158 B2
(45) Date of Patent: Jun. 14, 2016

(54) ENGINE SOUND ENHANCEMENT BASED ON VEHICLE SELECTED MODE

(71) Applicant: GM Global Technology Operations LLC, Detroit, MI (US)

(72) Inventors: Roger C. Barlow, Jr., Brighton, MI (US); Scott M. Reilly, Davisburg, MI (US); Dennis Klug, West Bloomfield, MI (US); Frank C. Valeri, Novi, MI (US)

(73) Assignees: GM GLOBAL TECHNOLOGY CORPORATION LLC, Detroit, MI (US); BOSE CORPORATION, Framingham, MA (US)

( * ) Notice: Subject to any disclaimer, the term of this patent is extended or adjusted under 35 U.S.C. 154(b) by 290 days.

(21) Appl. No.: 13/938,799

(22) Filed: Jul. 10, 2013

(65) Prior Publication Data

US 2015/0016627 A1    Jan. 15, 2015

(51) Int. Cl.
*H04R 25/00* (2006.01)
*B60Q 5/00* (2006.01)
*G10K 15/04* (2006.01)
*B60Q 9/00* (2006.01)
*H04R 3/00* (2006.01)

(52) U.S. Cl.
CPC .. *B60Q 5/00* (2013.01); *B60Q 9/00* (2013.01); *G10K 15/04* (2013.01); *H04R 3/00* (2013.01); *H04R 2499/13* (2013.01)

(58) Field of Classification Search
CPC ...... H04R 2499/13; H04R 1/028; B60Q 5/00; G10K 15/04; G10K 15/02

USPC ................ 381/86, 120, 71.4, 61; 340/425.5; 701/36, 301, 93, 1; 29/594

See application file for complete search history.

(56) References Cited

U.S. PATENT DOCUMENTS

| 8,620,001 | B2 * | 12/2013 | Peachey | .................. | B60Q 5/00 |
| | | | | | 381/61 |
| 2011/0010269 | A1 | 1/2011 | Ballard | | |
| 2012/0257763 | A1 * | 10/2012 | Bowden | ............... | G10K 11/178 |
| | | | | | 381/71.4 |
| 2015/0016627 | A1 * | 1/2015 | Barlow et al. | ................... | 381/86 |

FOREIGN PATENT DOCUMENTS

| CN | 201824948 | 5/2011 |
| CN | 102481927 | 5/2012 |
| CN | 102714033 | 10/2012 |

OTHER PUBLICATIONS

China Patent Application No. 201410327144.8 Office Action issued Feb. 3, 2016, 11 pages.

* cited by examiner

*Primary Examiner* — Ahmad F Matar
*Assistant Examiner* — Hoang H Nguyen
(74) *Attorney, Agent, or Firm* — Cantor Colburn LLP

(57) ABSTRACT

A control system is provided for a vehicle having an engine which transitions between an activated mode and a deactivated mode. The control system includes a vehicle bus transmitting a signal indicating a vehicle selected mode and if the engine is operating in one of the activated mode and the deactivated mode. The control system also includes an engine sound enhancement ("ESE") module configured to receive the signal. The ESE module is configured to select at least one ESE tone and a set of ancillary tones associated with one or more of the deactivated mode, the activated mode, and an activation transition. The ESE module selects a specific type of ancillary tones based on the vehicle selected mode.

20 Claims, 4 Drawing Sheets

ENGINE SOUND ENHANCEMENT BASED ON VEHICLE SELECTED MODE

FIELD OF THE INVENTION

Exemplary embodiments of the invention relate to a control system for a vehicle, and more particularly to a control system providing engine sound enhancement for an engine that transitions between an activated mode and a deactivated mode of the engine while utilizing a vehicle selected mode.

BACKGROUND

Some types of engine control systems may deactivate a portion of an engine's cylinders under specific low load operating conditions. For example, an eight cylinder engine may be operated using four cylinders in some types of low load operating conditions to improve fuel economy. Operation using all of the engine cylinders is referred to as an activated mode, and a deactivated mode refers to operation using less than all of the engine cylinders.

A vehicle selected mode refers to a selectable driving mode of a vehicle. When selected, the vehicle selected mode will modify operation of various systems of the vehicle such as, but not limited to, a vehicle steering system, a vehicle suspension, and a vehicle audio system. Some examples of vehicle selected modes include, but are not limited to, Race, Luxury, Normal, Stealth, City, Sport, and Economy. For example, in Sport mode (or any other mode that enhances powerful driving) various operating parameters of the vehicle are modified to enhance acceleration and as well as the overall driving experience (e.g., the vehicle audio system may provide an aggressive or powerful powertrain sound to the vehicle occupants). The enhanced level of sound provided by the vehicle audio system based on the selected driving mode may be referred to as a sound quality mode.

Although deactivating a portion of the engine's cylinders may improve fuel economy, the sound quality in all of the vehicle selected modes will be affected. For example, the powerful powertrain sound provided by the vehicle audio system in Sport mode may be discontinuous or sharply contrast when compared to the engine sound created by the engine in deactivated mode, which is noticeable to the occupants of the vehicle. Moreover, as the engine transitions from the activated mode to the deactivated mode, this may create a transitioning sound that is noticeable to the occupants of the vehicle. Accordingly, it is desirable to provide a sound enhancement that masks or blends the transitioning sounds from the engine.

SUMMARY OF THE INVENTION

In one exemplary embodiment of the invention, a control system is provided for a vehicle having an engine which transitions between an activated mode and a deactivated mode. The control system includes a vehicle bus transmitting a signal indicating a vehicle selected mode and if the engine is operating in one of the activated mode and the deactivated mode. The control system also includes an engine sound enhancement ("ESE") module configured to receive the signal. The ESE module is configured to select at least one ESE tone and a set of ancillary tones if the engine is operating in the deactivated mode. The ESE module selects a specific type of ancillary tones based on the vehicle selected mode.

In another exemplary embodiment of the invention a control system is provided for a vehicle having an engine that operates in one of an activated mode and a deactivated mode. The control system includes a vehicle bus transmitting a vehicle selected mode signal and a signal indicating a plurality of operating conditions. A transition determination module is configured to receive the signal and determine a transition signal based on the plurality of operating conditions. The transition signal indicates the engine is about to undergo a transition between the activated mode and the deactivated mode. An engine sound enhancement ("ESE") module is configured to receive the transition signal and the vehicle selected mode signal. The ESE module is further configured to select at least one ESE tone and a set of ancillary tones if the transition signal is received. The ESE module selects a specific type of ancillary tones based on the vehicle selected mode.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
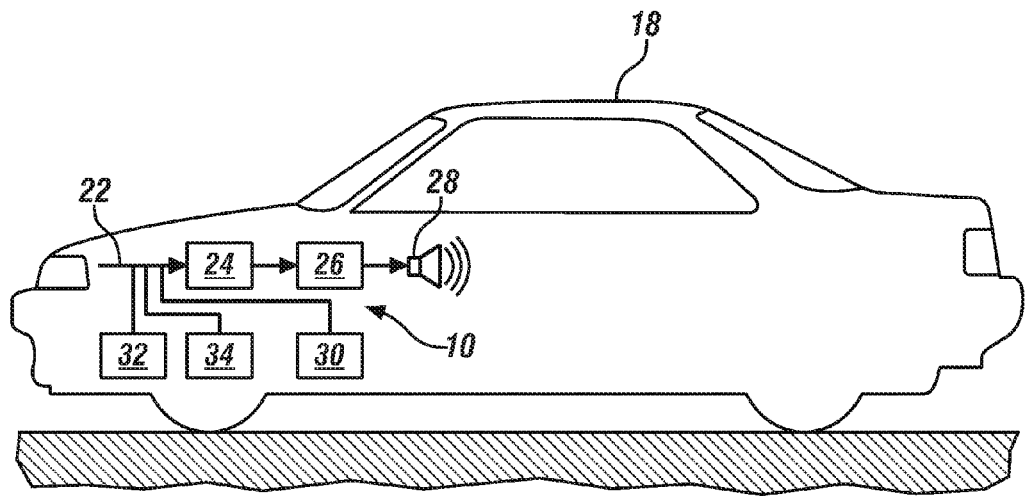
FIG. 1 is a schematic diagram of an exemplary control system in a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 depicts a control system 10 for providing engine sound enhancement for a vehicle 18. The control system 10 includes a vehicle bus 22, a control module 24, an amplifier 26, a transducer 28, and an engine 30. The control system 10 is configured for enhancing specific tones or sounds that are emitted by the engine 30 based on various operating parameters of the vehicle 18. The vehicle bus 22 is in communication with the control module 24, a vehicle selected mode module 32, and an engine control module ("ECM") 34. Although FIG. 1 illustrates the control module 24, the vehicle selected mode module 32, and the ECM 34 as separate control modules, it is to be understood that the modules may be combined together as well.

The engine 30 is a multi-cylinder internal combustion engine including any number of cylinders (e.g., the engine 30 may include two, three, four, five, six, eight, ten, twelve, or sixteen cylinders). The engine 30 may be controlled to selectively activate and deactivate operation of one or more cylinders (not shown) to accommodate changes in power demands of the vehicle 18. Transitioning from partial cylinder operation to full cylinder operation may be referred to as an activation transition. For example, the engine 30 may be an eight cylinder engine that transitions from operating with four cylinders firing to operating with eight cylinders firing based on an increase in power demand. Transitioning from full cylinder operation to partial cylinder operation may be referred to as a deactivation transition. For example, the engine 30 may be controlled to transition from operating with eight cylinders firing to operating with four cylinders firing based on a decrease in power demand. Operation using all of the cylinders of the engine 30 is referred to as an activated mode, and a deactivated mode refers to operation using less than all of the cylinders.

The vehicle selected mode module 32 is configured to modify operation of various systems of the vehicle 18 based on a vehicle selected mode. The vehicle selected mode is a customized setting of the vehicle 18 that enhances a specific style of driving by modifying one or more vehicle systems. Some examples of the vehicle selected mode include, but are not limited to, Luxury, Track, Normal, Stealth, City, Sport, and Economy. Some examples of vehicle systems that may be modified based on the vehicle selected mode include, but are not limited to, a vehicle steering system (not shown), a vehicle suspension (not shown), a vehicle exhaust system (not shown), and the control system 10 (which includes the amplifier 26 and the transducer 28). Specifically, the control system 10 may enhance specific tones or sounds that are emitted by the engine 30 based on the vehicle selected mode, which is discussed in greater detail below. For example, in Luxury mode, the control system 10 may emit a smooth, sonorous engine sound through the transducer 28, which gives the vehicle occupants the impression of a refined powertrain. In contrast, in Sport mode (or any other mode that provides a powerful driving experience), the control system 10 may emit a tonal or rough engine sound through the transducer 28, which gives the vehicle occupants the impression of a relatively powerful engine.

The control module 24 is in operable communication with the vehicle bus 22 and the amplifier 26. The amplifier 26 receives a control signal from the control module 24. The amplifier 26 converts the control signal to an electrical signal that is used to drive the transducer 28. Although FIG. 1 illustrates the control module 24 and the amplifier 26 as separate components, it is understood that the control module 24 and the amplifier 26 may be integrated into a single unit as well. In one exemplary approach, the transducer 28 is a speaker that is configured for emitting an audio signal that combines or blends with the tones that are emitted from the engine 30, an exhaust gas system (not illustrated), and an air induction system (not shown) of the vehicle 18. In one embodiment, the transducer 28 may be part of an infotainment system of the vehicle 18. While only a single transducer 28 is depicted in FIG. 1, it will be understood that multiple transducers 28 can be driven by the amplifier 26 to provide sound enhancement as described herein.

Figure 2:
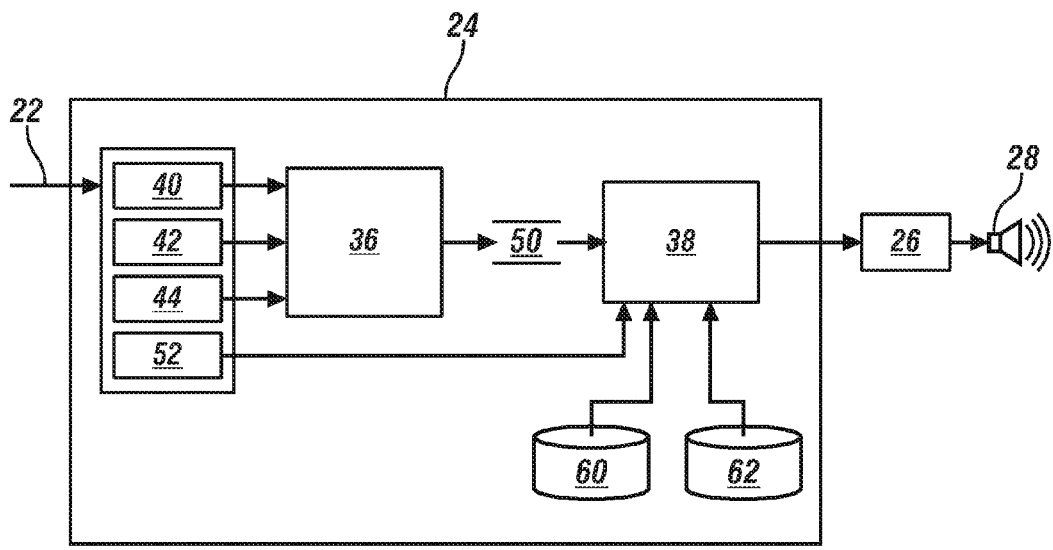
FIG. 2 is a dataflow diagram of a control module shown in FIG. 1.

Referring now to FIG. 2, a dataflow diagram illustrates an exemplary embodiment of the control module 24 of FIG. 1 that is used to blend transitioning sounds created by the engine 30 during either the activation transition or the deactivation transition. The control module 24 is typically used in vehicle applications where a relatively low level of sound is emitted by the engine 30. Specifically, the control module 24 may be used in luxury vehicle applications, where more refined engine sounds are typically expected by the vehicle occupants. In various embodiments, the control module 24 may include one or more sub-modules and data stores. As used herein the terms module and sub-module refer to processing circuitry that can include an application specific integrated circuit (ASIC), an electronic circuit, a processor (shared, dedicated, or group) and memory that executes one or more software or firmware programs, or a combinational logic circuit. As can be appreciated, the sub-modules shown in FIG. 2 can be combined and/or further partitioned.

In the exemplary embodiment as shown in FIG. 2, the control module 24 includes a transition determination module 36 and an engine sound enhancement ("ESE") module 38. The transition determination module 36 receives as input a plurality of operating conditions from the vehicle bus 22 that indicate if the engine 30 is about to undergo a transition. In one embodiment, the plurality of operating conditions may include an engine torque signal 40, an engine speed signal 42, and an engine activation/deactivation signal 44. The engine activation/deactivation signal 44 indicates if the engine 30 (FIG. 1) is operating in the activated mode or the deactivated mode. The transition determination module 36 may then determine a transition signal 50 based on the inputs. The transition signal 50 indicates if the engine 30 (FIG. 1) is about to transition from either partial cylinder operation to full cylinder operation, or from full cylinder operation to partial cylinder operation. In other words, the transition signal 50 determines if the activation transition or the deactivation transition is imminent (e.g., is about to occur in a few seconds).

The ESE module 38 receives as input the transition signal 50 from the transition determination module 36 and a mode signal 52 from the vehicle bus 22. The mode signal 52 indicates the vehicle selected mode (e.g., Race, Normal, Stealth, City, Sport, or Economy). The ESE module 38 also receives as input a plurality of engine order parameters from a database 60. The engine order parameters each correspond to a rotational frequency of a crankshaft (not shown) of the engine 30 (shown in FIG. 1). The engine order parameters may be unique to a specific powertrain as well as the type of vehicle (e.g., sporty car, midsize sedan, luxury vehicle, etc.). Specifically, in one exemplary embodiment, the engine order parameters may depend on factors such as, but not limited to, the number of cylinders of the engine 30, engine displacement, engine aspiration (e.g., normally aspirated versus forced induction), engine calibration, vehicle selected mode, cam timing, or an exhaust gas system (not shown) of the vehicle 18. Each engine order produces a specific frequency tone.

The ESE module 38 includes logic for determining specific ESE tones that are used to blend transitioning sounds created by the engine 30 during either the activation transition or the deactivation transition. In particular, the ESE module 38 determines the type, frequency, timing, and duration of ESE tones that are required to blend transitioning sounds created by the engine 30. The ESE module 38 may be in operable communication with a database 62 that contains a plurality of pre-programmed tones. The ESE module 38 selects specific pre-programmed tones based on the specific ESE tones that are needed to blend transitioning sounds created by the engine 30 during either the activation transition or the deactivation transition. In an alternative embodiment, the ESE module 38 includes control logic for calculating the tones that are needed to blend transitioning sounds.

The pre-programmed tones are sent to the amplifier 26. The amplifier 26 converts the pre-programmed tones to an electrical signal that is used to drive the transducer 28. In one approach, the transducer 28 is a speaker that emits an audio signal that combines with the sound emitted from the engine 30 (FIG. 1). Specifically, the audio signal emitted from the speaker is blended with the sound emitted from the engine 30, and creates sounds that bridges transitioning sounds made by the engine 30 (e.g., during either the activation transition or the deactivation transition).

Figure 3:
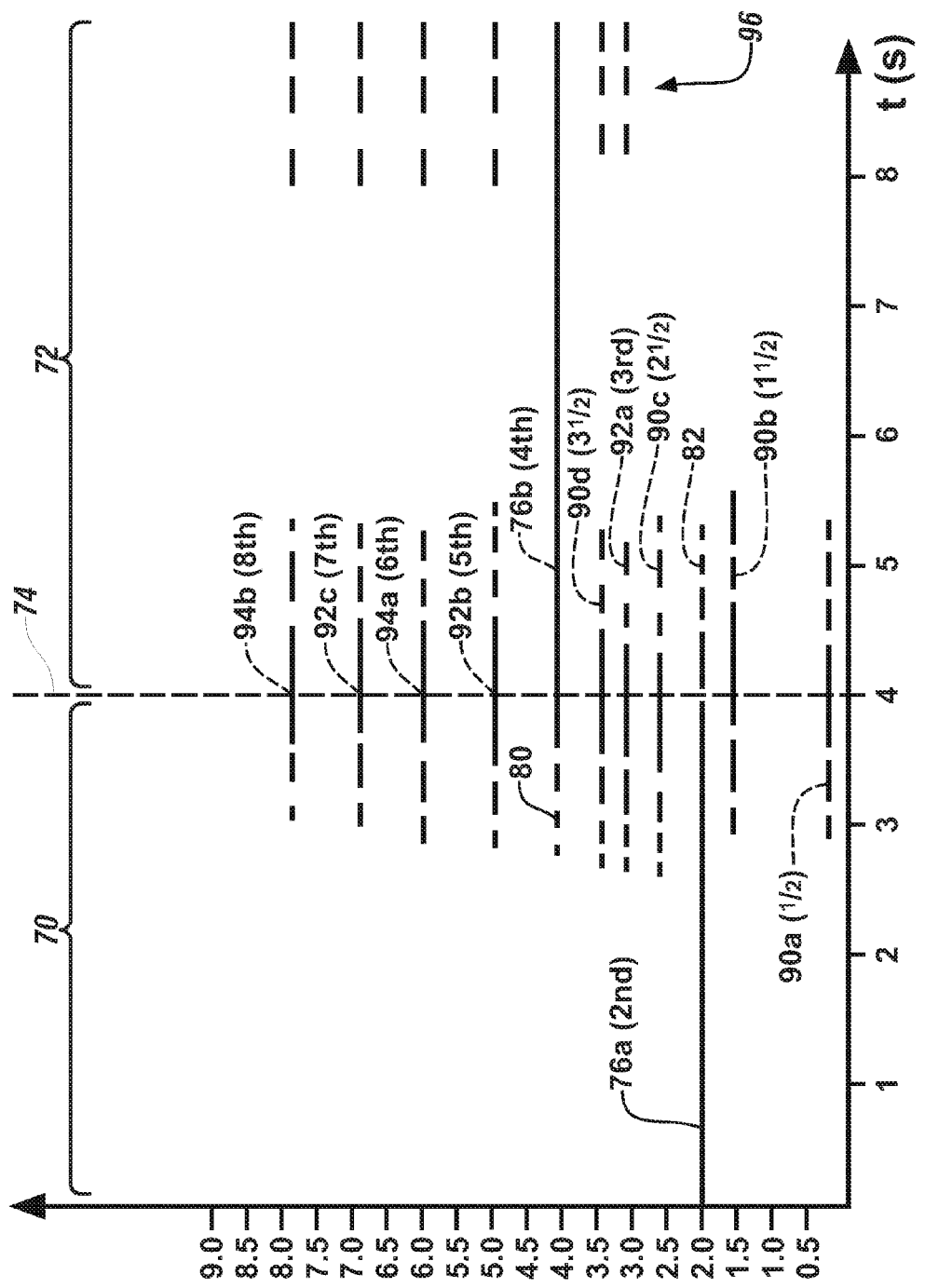
FIG. 3 is an illustration of an exemplary graph illustrating engine sound enhancement provided by the control module in FIG. 2.

FIG. 3 is an exemplary sound graph illustrating operation of the vehicle 18, where the engine 30 (FIG. 1) transitions from a deactivated mode 70 to an activated mode 72. The x-axis represents time (in seconds) and the y-axis represents an order of the engine 30. The activation transition (where the engine 30 transitions between the deactivated mode 70 to the activated mode 72) is indicated by reference number 74. The engine 30 (FIG. 1) emits a set of dominant orders 76a and 76b. The dominant orders represent one or more engine orders that are pronounced during operation. The term "dominant order" may also be referred to as "dominant firing order", which can vary based on a dominant firing sequence of the engine 30 (e.g., second order noise is dominant for four cylinders; third order noise is dominant for six cylinders; fourth order noise is dominant for eight cylinders, etc.). The dominant order (or orders) emitted by the engine 30 changes as the engine 30 transitions from the deactivated mode 70 to the activated mode 72. For example, in the embodiment as shown in FIG. 3, in the deactivated mode 70 the dominant order 76a is a second order value. After the activation transition 74 occurs and the engine 30 operates in the activated mode 72, the dominant order 76a changes in value to the dominant order 76b. The dominant order 76b is a fourth order value in this example.

Referring to both FIGS. 2 and 3, immediately before the activation transition 74 occurs (which is determined by the activation signal 50 in FIG. 2), the ESE module 38 selects an ESE tone 80 (shown in phantom line) that is emitted by the transducer 28. Specifically, once the ESE module 38 receives the activation signal 50, this is an indication that the activation transition 74 is imminent or about to occur. The ESE module 38 may then select the ESE tone 80 from the database 62 (FIG. 2). The ESE tone 80 emulates or mimics the dominant order 76b (e.g., the dominant order of the engine 30 in the activated mode 72). The ESE tone 80 is gradually phased in, and blends with the dominant order 76a (e.g., the natural dominant order created by the engine 30 during the deactivated mode 70). In addition to the ESE tone 80 being blended with the dominant order 76a, the ESE module 38 also selects an ESE tone 82 (also shown in phantom line) immediately after the activation transition 74 occurs. The ESE tone 82 emulates the dominant order 76a (e.g., the dominant order of the engine 30 in the deactivated mode). The ESE tone 82 is gradually phased out by the ESE module 38 after the engine 30 (FIG. 1) undergoes the activation transition 74.

In addition to the ESE tones 80 and 82, the ESE module 38 may also introduce a set of ancillary tones before the activation transition 74 as well. The set of ancillary tones emphasizes natural engine sounds produced by the engine 30 in the deactivated mode 70. The set of ancillary tones may be gradually phased in or introduced by the ESE module 38 before the activation transition 74, and are gradually phased out after the activation transition 74 occurs. In the exemplary embodiment as shown in FIG. 3, the set of ancillary tones may include half order tones (e.g., a half order 90a, a one and a half order 90b, a two and a half order 90c, and/or a three and a half order 90d, which are all in phantom line), as well as odd order tones (e.g., a third order tone 92a, a fifth order tone 92b, and/or a seventh order tone 92c, which are all in phantom line). In addition to the half order tones and the odd order tones, the set of ancillary tones may also include even order tones (e.g., a sixth order tone 94a and/or an eighth order tone 94b, which are all in phantom line). The set of ancillary tones may be blended with the ESE tones 80 and 82 in order to create a more realistic engine sound.

The half order tones 90a-90d interact with both the odd order tones 92a-92c and the even order tones 94a-94b to produce percussive sounds. Specifically, the interaction between the half order tones 90a-90d with both the odd order tones 92a-92c and the even order tones 94a-94b and are typically perceived by vehicle occupants as a rough or growling sound. The growling sound is generally defined as a sound the engine 30 (FIG. 1) produces while being controlled or requested to deliver power relatively quickly (e.g., a powerful engine condition).

Around the activation transition 74, to achieve a quieter and more seamless sounding vehicle experience, particular tones with corresponding amplitudes are selected to produce a natural blended overall sonorous sound while minimizing the amount of sound added through the transducer 28 of FIG. 2. Additionally, the powerful sounds (typically at higher RPM ranges) are added to the vehicle sound after the activation transition 74. One or more tones 96 of the set of ancillary tones can be removed and added in the activated mode 72 after the activation transition 74 based on the engine speed signal 42 of FIG. 2. In the example of FIG. 3, tones that are included through the activation transition 74 dissipate and are removed from the audio output of the transducer 28 of FIG. 2 after a relatively short period of time. If the engine speed signal 42 of FIG. 2 indicates a continued increase in speed, powerful sounds can be added at a later time in the activated mode 72 as the one or more tones 96 to further enhance the sound profile at higher engine RPMs. This may occur even when operating in a luxury mode.

The ESE module 38 selects specific types of ancillary tones (e.g., the half orders 90a-90d, the odd orders 92a-92c, and the even order tones 94a-94b), which may be based on the vehicle selected mode. For example, if the vehicle selected mode indicates a driver is expecting a powerful driving experience (e.g., the Sport mode is selected), the ESE module 38 may select a set of ancillary tones that produce the growling engine sound. Specifically, the ESE module 38 may insert one or more half order tones (e.g., one or more of the half order tones 90a-90d) that interact with one or more of the integer orders (the integer order are the odd order tones 92a-92c or the even order tones 94a-94b) in order to produce the rough engine sound. Likewise, if the vehicle selected mode indicates that a smooth, sonorous engine sound is desired (e.g., the luxury mode is selected), then the number of half order tones selected by the ESE module 38 may be reduced.

The ESE module 38 may also select the set of ancillary tones based on the type of transition as well. The engine 30 tends to produce a rougher engine sound when operating in the deactivated mode 70 when compared to the activated mode 72. Thus, if the engine 30 undergoes the activation transition (e.g., from the deactivated mode 70 to the activated mode 72), the ESE module 38 may introduce more half order tones when compared to the engine 30 undergoing the deactivation transition (e.g., from the activated mode 72 to the deactivated mode 70).

The ESE module 38 may also augment or amplify one or more of the ancillary tones or the dominant order based on the vehicle selected mode. For example, if the vehicle selected mode indicates a powerful driving experience is desired (e.g., the Sport mode is selected), the ESE module 38 may amplify specific ancillary tones that produce a rumbling or low frequency sound. The rumbling sound is created by a set of low frequency tones that generally range between the one and a half order 90b to the fifth order tone 92b. For example, in the embodiment as shown in FIG. 3, in order to produce the rumbling sound during the deactivated mode 70, the ESE module 38 may amplify a portion of the half orders (e.g., the half order 90a, the one and a half order 90b, the two and a half order 90c, and the three and a half order 90d) and a portion of the odd order tones (e.g., the third order tone 92a and the fifth order tone 92b).

A buzzing or trilling tone may be created in combination with natural powertrain orders via the augmentation of the orders by the transducer 28 to compliment the rumbling sound. The trilling tone or sound is generally defined as a trembling or fluttering sound. Trilling tones can be produced by amplifying one or more engine orders that are above the dominant order 76b. For example, in the embodiment as shown in FIG. 3, the trilling sound may be produced by amplifying one of the odd orders (e.g., the seventh order tone 92c) and one of the even orders (e.g., the eighth order 94b). In another example, trilling tones can be between ten to twenty orders above the dominant order 76b.

If the vehicle selected mode indicates that a smooth, sonorous engine sound is desired (e.g., the luxury mode is selected), then the ESE module 38 may amplify or augment the dominant order created during the activated mode 72 (e.g., the dominant order 76b). For example, in the embodiment as shown in FIG. 3, the dominant order 76b would be amplified before the engine 30 (FIG. 1) undergoes the activation transition 74. In addition to amplifying the dominant order created during the activated mode 72, the ESE module 38 may also amplify a specific subset of engine orders and apply activation transition fading as well. This subset of orders can be a combination of half or full orders depending on the desired character or roughness of the enhanced sound desired.

Figure 4:
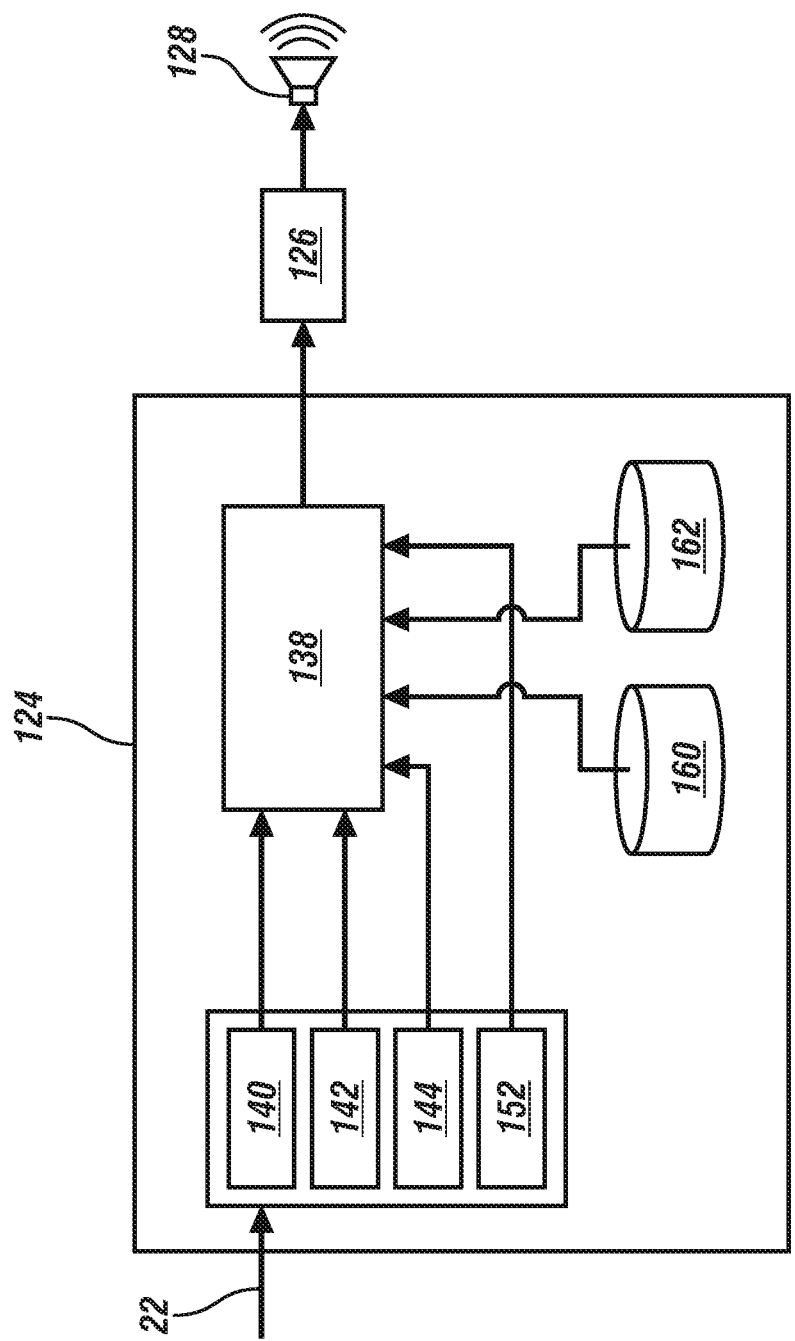
FIG. 4 is a dataflow diagram of an alternative embodiment of the control module shown in FIG. 1.

FIG. 4 is an alternative embodiment of a control module 124. The control module 124 is used to mask or conceal transitioning sounds created by the engine 30 (FIG. 1) during either the activation transition or the deactivation transition. The control module 124 is typically used in vehicle applications where a relatively high level of sound emitted by the engine 30 is permitted or even desirable, as this indicates a powerful engine. Masking or concealing the transitioning sounds created by the engine 30 produces a higher level of sound when compared to blending the transitioning sounds. Thus, the control module 124 is typically used in a sports car application, where a louder, more powerful engine sound is expected. In contrast, the control module 24 as described in FIG. 2, which generally blends transitioning sounds, is typically used in luxury vehicle applications. This is because luxury vehicle applications generally require quieter, more refined engine sounds.

In the exemplary embodiment as shown in FIG. 4, the control module 124 includes an ESE module 138. The ESE module 138 receives as input an engine torque signal 140, an engine speed signal 142, an engine activation/deactivation signal 144, and a mode signal 152 from the vehicle bus 22. The ESE module 138 also receives as input a plurality of engine order parameters from a database 160.

In the embodiment as shown in FIG. 4, the ESE module 138 includes logic for determining specific ESE tones that are used to mask or conceal transitioning sounds created by the engine 30 during the activation transition or the deactivation transition (e.g., a transducer or speaker 128 emits audio signals that cover or mask the transitioning sound created by the engine 30 after amplification by an amplifier 126). In particular, the ESE module 138 determines the type, frequency, timing, and duration of ESE tones that are required to mask transitioning sounds created by the engine 30. The ESE module 138 may be in operable communication with a database 162 that contains a plurality of pre-programmed tones. The ESE module 138 selects specific pre-programmed tones based on the specific ESE tones that are needed to mask transitioning sounds created by the engine 30 during either the activation transition or the deactivation transition. In an alternative embodiment, the ESE module 138 includes control logic for calculating the tones that are needed to mask transitioning sounds.

Figure 5:
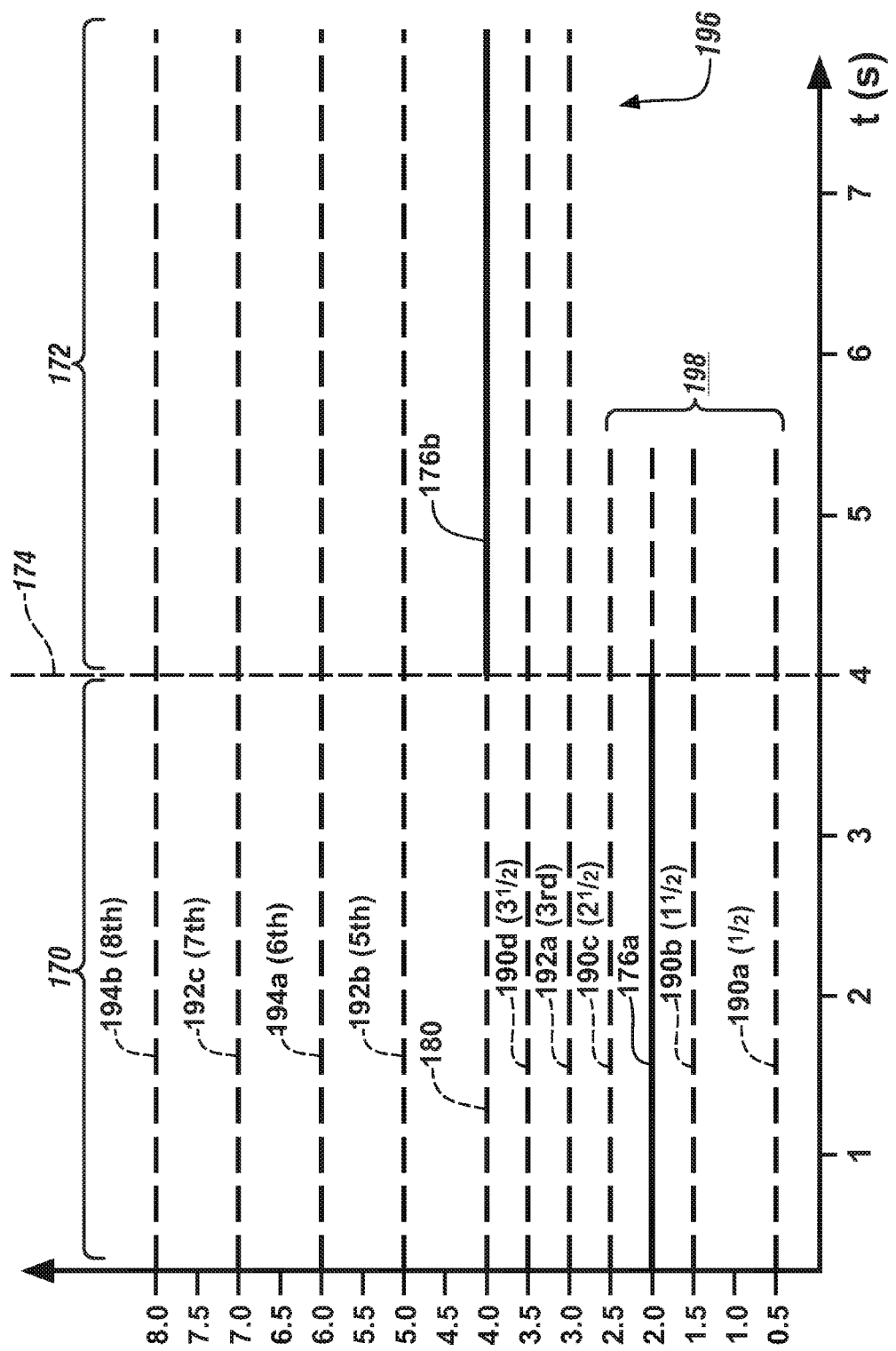
FIG. 5 is an illustration of an exemplary graph illustrating engine sound enhancement provided by the control module in FIG. 4.

FIG. 5 is an exemplary sound graph illustrating operation of the vehicle 18, where the control module 124 of FIG. 4 determines tones to mask or conceal transitioning sounds created by the engine 30 (FIG. 1). In the embodiment as shown, the engine 30 transitions from a deactivated mode 170 to an activated mode 172. The x-axis represents time (in seconds) and the y-axis represents an order of the engine 30. The activation transition (where the engine 30 transitions from the deactivated mode 170 to the activated mode 172) is indicated by reference number 174. The engine 30 (FIG. 1) emits a set of dominant orders 176a and 176b. In the deactivated mode 170, the dominant order 176a is a second order value. After the activation transition 174 occurs and the engine 30 operates in the activated mode 172, the dominant order 176a increases in value to the dominant order 176b, which is a fourth order value in the example of FIG. 5.

Referring to both FIGS. 4 and 5, the ESE module 138 selects an ESE tone 180 (shown in phantom line) that generally masks or conceals the sound made by the engine 30 during the activation transition 174. The ESE tone 180 is emitted by the transducer 128 if the engine operates in the deactivated mode 170. The ESE tone 180 may be selected from the database 162 (FIG. 4) containing the plurality of pre-programmed tones. The ESE tone 180 emulates or mimics the dominant order 176b (e.g., the dominant order of the engine 30 in the activated mode). Thus, the dominant order 176b is always heard by the occupants of the vehicle 18 (FIG. 1), even if the engine 30 is operating in the deactivated mode 170. Therefore, as the activation transition 174 occurs, the occupants of the vehicle 18 do not generally notice that the engine 30 has transitioned from the deactivated mode 170 to the activated mode 172. In other words, the ESE module 138 masks or conceals the transitioning sound by giving the impression to the vehicle occupants that the engine 30 is constantly operating in the activated mode 172. Once the engine 30 has undergone the activation transition 174, the ESE tone 180 is phased out by the ESE module 138.

In addition to the ESE tone 180, the ESE module 138 may also select a set of ancillary tones that are emitted by the transducer 128 as the engine 30 operates in the deactivated mode 170. The set of ancillary tones may be blended with the ESE tone 180 to create a more realistic engine sound. Similar to the embodiment as shown in FIG. 3, the set of ancillary tones may include half order tones (e.g., a half order 190a, a one and a half order 190b, a two and a half order 190c, and/or a three and half order 190d, which are all in phantom line), odd order tones (e.g., a third order tone 192a, a fifth order tone 192b, and/or a seventh order tone 192c, which are all in phantom line), and even order tones (e.g., the sixth order tone 194a and/or the eighth order tone 194b, which are all in phantom line).

The ESE module 138 selects the set of ancillary tones (e.g., the half orders 190a-190d, the odd orders 192a-192c, and the even order tones 194a-194b) which may be based on the mode signal 152 (FIG. 4) that indicates the vehicle selected mode. The orders selected to form particular ancillary tones are determined based on desired sounds for particular conditions and may align with the vehicle selected mode. For example, if the vehicle selected mode indicates a driver is expecting an especially powerful driving experience (e.g., Track, Sport, or Race mode is selected), the ESE module 138 may select a set of ancillary tones that produce a rough or growling engine sound. Specifically, the ESE module 138 may insert one or more half order tones (e.g., one or more of the half order tones 190a-190d) in order to produce the rough engine sound. Likewise, if the vehicle selected mode indicates that a relatively smooth engine sound is desired (e.g., Eco, Tour, Normal, Weather mode, and the like), then the number of half order tones selected by the ESE module 138 may be reduced.

The ESE module 138 may also select the set of ancillary tones based on the type of transition as well. The engine 30 tends to produce a rougher engine sound when operating in the deactivated mode 170 when compared to the activated mode 172. Thus, if the engine 30 undergoes the activation transition (e.g., from the deactivated mode 170 to the activated mode 172), the ESE module 138 may introduce more half order tones when compared to the engine 30 undergoing the deactivation transition (e.g., from the activated mode 172 to the deactivated mode 170).

The ESE module 138 may also augment or amplify one or more of the ancillary tones or the dominant order based on the vehicle selected mode. For example, if the vehicle selected mode indicates an especially powerful driving experience is desired (e.g., Track, Sport, or Race mode is selected), the ESE module 138 may select a set of ancillary tones that produce a rumbling sound. In one embodiment, the rumbling sounds may be created by selecting relatively low frequency orders (e.g., the low frequency orders generally range from the one and a half order 190b to the fifth order tone 192b). In one embodiment, a buzzing or trilling tone or sound may be used to compliment the rumbling sound. Trilling tones may be produced by amplifying engine orders that are, for example, ten to twenty orders above the dominant order. As another example, the trilling sound may be produced by amplifying one of the odd orders (e.g., the seventh order tone 192c) and one of the even orders (e.g., the eighth order 194b).

When a powerful driving experience is selected, and the set of ancillary tones selected for the powerful driving experience continue from the deactivated mode 170 through the activation transition 174 to the activated mode 172. One or more tones 196 of the set of ancillary tones continue in the activated mode 172, while one or more tones 198 can be removed after the activation transition 174 based on the engine speed signal 142 of FIG. 4. In the example of FIG. 5, the one or more tones 198 that fade out are associated with lower orders, such as the half order 190a to the two and a half order 190c, while the one or more tones 196 that remain are associated with higher orders, such as the third order 192a to the eighth order 194b. To maintain a powerful sound before and after the activation transition 174, the dominant order emphasized as having the greatest amplitude changes at the activation transition 174. For example, an emphasized order in FIG. 5 is the dominant order 176a in the deactivated mode 170 and is the dominant order 176b in the activated mode 172, where the dominant order 176b is twice the dominant order 176a in the example of FIG. 5.

If the vehicle selected mode indicates that a relatively smooth engine sound is desired (e.g., the Tour mode is selected), then the ESE module 138 may amplify or augment the ESE tone 180 (which mimics the dominant order 176b in the activated mode 172). In addition to amplifying the dominant order created during the activated mode 172, the ESE module 138 may also amplify a specific subset of engine orders as well. The subset may be a combination of full engine mode harmonics, such as a combination of 2nd, 4th, 6th, and $8^{th}$ orders for an eight cylinder embodiment of the engine 30, or a combination of 1.5, $3^{rd}$, 4.5, and $6^{th}$ orders for a six cylinder embodiment of the engine 30. Again, the orders to produce a relatively smooth engine sound span the activation transition 174 and can continue as the engine speed signal 142 of FIG. 4 indicates higher RPMs.

Referring generally to FIGS. 1-5, the embodiments as described above provide an approach to either blend the transitioning sound created by the engine 30 (e.g., the control module 24 as described in FIGS. 2-3), or to mask the transitioning sound created by the engine 30 (e.g., the control module 124 as described in FIGS. 4-5). In addition to blending the transitioning sound created by the engine 30, the control module 24 may select a set of ancillary tones (e.g., the half orders 90a-90d, the odd orders 92a-92c, and the even order tones 94a-94b) based on the vehicle selected mode. Likewise, the control module 124 may select a set of ancillary tones based on the vehicle selected mode. The set of ancillary tones are used to enhance the sound created by the ESE system based on the vehicle selected mode. In particular, the set of ancillary tones may be customized depending on the specific vehicle selected mode.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A control system for a vehicle, the vehicle having an engine that transitions between an activated mode and a deactivated mode, comprising:
  a vehicle bus transmitting a signal, the signal indicating a vehicle selected mode and if the engine is operating in one of the activated mode and the deactivated mode, the activated mode comprising operation of the engine using all cylinders of the engine and the deactivated mode comprising operation of the engine using fewer than all cylinders of the engine; and
  an engine sound enhancement ("ESE") module configured to receive the signal, the ESE module configured to select at least one ESE tone and a set of ancillary tones if the engine is operating in the deactivated mode, wherein the ESE module selects a specific type of ancillary tones based on the vehicle selected mode.

2. The control system of claim 1, wherein the specific type of ancillary tones includes one or more of: a half order tone, an even order tone, and an odd order tone.

3. The control system of claim 1, wherein the ESE tone emulates a dominant order created by the engine in the activated mode, and the ESE module is configured to augment the ESE tone based on the vehicle selected mode.

4. The control system of claim 1, wherein the ESE tone is configured to conceal a sound created by the engine during an activation transition, wherein the activation transition represents the engine transitioning from the deactivated mode to the activated mode.

5. The control system of claim 4, wherein one or more tones of the set of ancillary tones are removed and added after the activation transition based on an engine speed.

6. The control system of claim 1, wherein the vehicle selected mode indicates a powerful driving experience is selected, and the set of ancillary tones selected for the powerful driving experience continue from the deactivated mode through an activation transition to the activated mode.

7. The control system of claim 6, wherein the ESE module selects a plurality of ancillary tones that are half order tones and integer order tones if the vehicle selected mode indicates the powerful driving experience, wherein the half order tones are configured to interact with the integer order tones to create a sound indicating a powerful engine condition.

8. The control system of claim 6, wherein one or more tones of the set of ancillary tones are removed after the activation transition based on an engine speed.

9. The control system of claim 6, wherein a dominant order having a greatest amplitude changes at the activation transition.

10. The control system of claim 6, wherein the ESE module augments one or more tones of the set of ancillary tones based on the vehicle selected mode.

11. A control system for a vehicle, the vehicle having an engine that operates in one of an activated mode and a deactivated mode, comprising:
 a vehicle bus transmitting a vehicle selected mode signal and a signal indicating a plurality of operating conditions;
 a transition determination module configured to receive the signal and determine a transition signal based on the plurality of operating conditions, wherein the transition signal indicates the engine is about to undergo a transition between the activated mode and the deactivated mode, the activated mode comprising operation of the engine using all cylinders of the engine and the deactivated mode comprising operation of the engine using fewer than all cylinders of the engine; and
 an engine sound enhancement ("ESE") module configured to receive the transition signal and the vehicle selected mode signal, the ESE module configured to select at least one ESE tone and a set of ancillary tones if the transition signal is received, wherein the ESE module selects a specific type of ancillary tones based on the vehicle selected mode.

12. The control system of claim 11, wherein the specific type of ancillary tones includes one or more of: a half order tone, an even order tone, and an odd order tone.

13. The control system of claim 11, wherein the ESE tone emulates a dominant order of the engine, and the ESE module is configured to augment the ESE tone based on the vehicle selected mode.

14. The control system of claim 11, wherein the ESE tone is configured to blend a sound created by the engine during the transition.

15. The control system of claim 14, wherein one or more tones of the set of ancillary tones are removed and added in the activated mode based on an engine speed.

16. The control system of claim 11, wherein the vehicle selected mode indicates a powerful driving experience is selected, and the set of ancillary tones selected for the powerful driving experience continue through the transition.

17. The control system of claim 16, wherein the ESE module selects a plurality of ancillary tones that are half order tones and integer order tones if the vehicle selected mode indicates the powerful driving experience, wherein the half order tones are configured to interact with the integer order tones to create a sound indicating a powerful engine condition.

18. The control system of claim 16, wherein one or more tones of the set of ancillary tones are removed in the activated mode based on an engine speed.

19. The control system of claim 16, wherein a dominant order having a greatest amplitude changes at the transition.

20. The control system of claim 16, wherein the ESE module augments one or more tones of the set of ancillary tones based on the vehicle selected mode.

* * * * *